3,009,778
ALUMINA MANUFACTURE IN LOW-STACK BLAST FURNACE

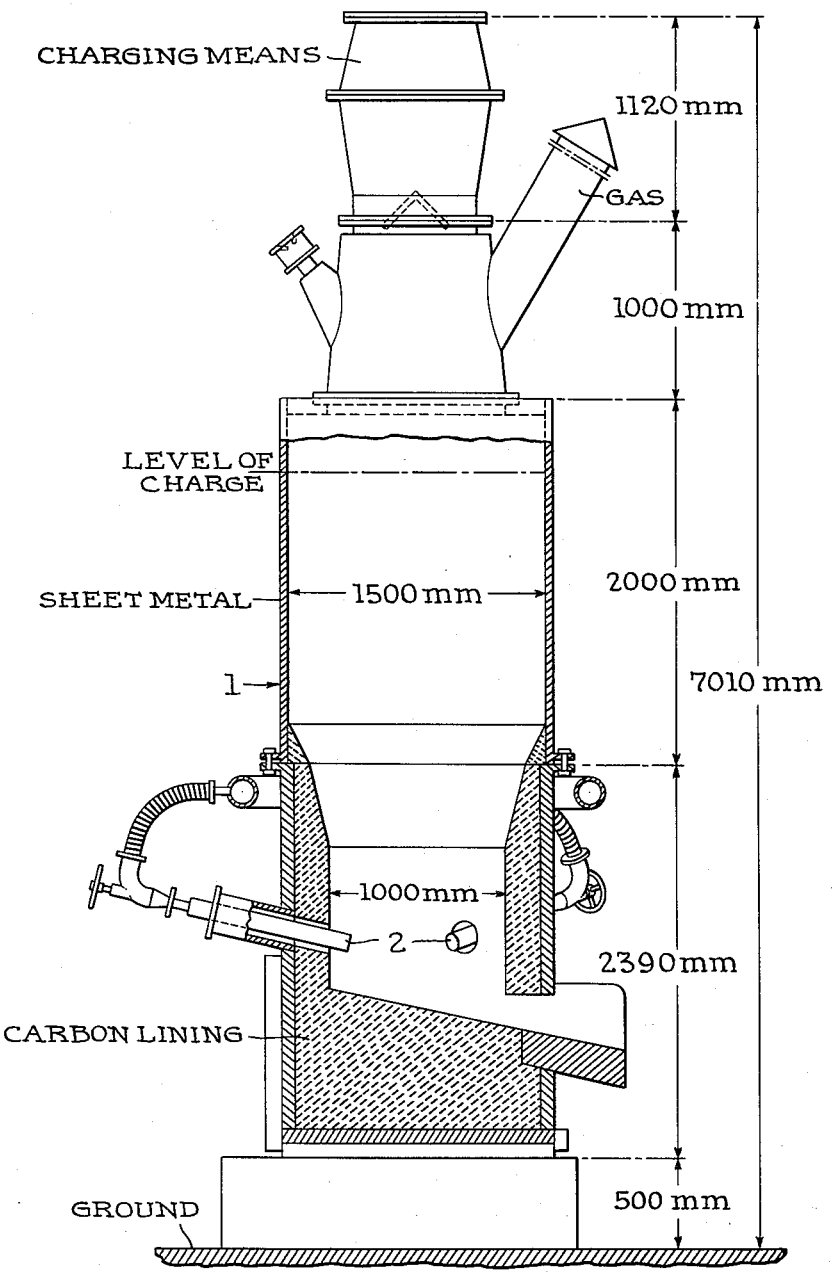

Pierre Tardieu, Edea, Cameroun, and René Périères, La Tronche, France, assignors to Pechiney, Compagnie de Produits Chimiques et Eletrometallurgiques, Paris, France, a corporation of France
Filed July 23, 1957, Ser. No. 673,633
Claims priority, application France July 31, 1956
6 Claims. (Cl. 23—142)

The present invention, which is based upon the results of applicants' researches, has for its object a process for the manufacture of alumina which makes use of a shaft furnace having a comparatively low height, commonly called a low-stack blast furnace.

One of the natural sources of alumina is bauxite from which aluminum oxide, $Al_2O_3$, is first extracted, generally, by the Bayer process.

However, the Bayer process which attacks the bauxite by means of an alkaline solution which, generally, contains soda, is ill-adapted for excessively siliceous bauxites because it leads to too large losses of soda and alumina.

A process has been proposed for treating siliceous bauxites which consists in treating in an electric furnace a mixture in suitable proportions of silica-rich bauxite, carbon and iron pyrites. There is produced in this way a mixed slag of $Al_2O_3+Al_2S_3$ containing about 80% oxide and 20% sulfide, which is very fluid at a temperature of the order of 1500° C., that is to say, considerably below the melting point of alumina (2050° C.). Simultaneously, the iron in the original bauxite is tapped off as a siliceous cast iron which contains the major portion of the other metallic impurities. Thereafter, the mixed slag is treated with water or dilute acid to hydrolyze the sulfide to yield thereby amorphous alumina, additional to the alumina already present in the mixture and which is in a finely crystalline state in the form of corundum.

Auxiliary procedures complete the process and enable:

(1) Recovery of the major portion of the sulfur in the $Al_2S_3$ by a presulfurization of the crude bauxite;

(2) Elimination, by an acid wash, of the major portion of the impurities Si, Ti, Fe still remaining in the initially obtained mixed slag.

Offsetting these advantages, the process suffers from a fundamental drawback, in that it requires a large consumption of electric power—about 5000 kwh. per ton alumina (i.e. approximately 10,000 kwh. per ton aluminum, which must be added to the kwh. units required for the electrolysis).

In those regions and at such times when electric power is scarce, it would be important to carry out this known process in an apparatus in which the necessary calories would be solely furnished by an ordinary fuel, for example, in a low-stack blast furnace. However, such an operation would appear paradoxical because sulfur and sulfides are volatile substances especially, at the very high temperatures obtained at the outlet of the tuyeres supplied with an oxygen-enriched blast.

Nevertheless, applicants have achieved this manufacture in a low-stack blast furnace blown with a blast of oxygen-enriched cold air containing 50 to 70% oxygen by using a proportion of pyrites in the charge, which is the greater the smaller the furnace diameter at the level of the tuyeres.

An important feature of the invention consists in controlling the feed of the shaft furnace and the blast in such a way, that all the constituents of the charge pass through a temperature zone of 1750 to 1850° C., the lower portion of which zone (at 1850° C.) is situated above the tuyeres, at about the middle of the distance between the ends of opposing tuyeres. The $Al_2S_3+Al_2O_3$ slag forms in that zone; this slag, which contains a major portion of $Al_2O_3$ and 15–25% $Al_2S_3$, leaves said zone in the liquid state and passes rapidly through the oxidizing and superheated zone situated immediately above and at the level of the tuyeres. The slag then passes into the lower zone of the furnace where it separates, by decantation, from the formed ferrosilicon and can be tapped off.

In order to illustrate the invention, there is described by way of example only, and without limitation, an embodiment of the new process as carried out in a shaft-furnace of the low-stack blast furnace type. The annexed single figure illustrates a partial, vertical section of such a furnace; the indicated dimensions are those of a low-stack blast furnace suitable for carrying out the present invention, and are given by way of illustration only and not by way of limitation.

The furnace used in carrying out the operation comprises a shaft 1, having a total height of about 7 meters, a diameter of 1 meter at the level of the tuyeres 2, and a working height of about 3 meters above the same level. The bauxite used in carrying out the process of the invention in this furnace had the following composition:

| | Percent |
|---|---|
| $Al_2O_3$ | 70–72 |
| $SiO_2$ | 7–8 |
| $TiO_2$ | 4.5 |
| $Fe_2O_3$ | 11–12 |

The charges for the furnace were made up as follows:

| | Kg. |
|---|---|
| Gas coke | 50–70 |
| Bauxite | 40–60 |
| Iron pyrites | 20–30 |

Treatment of such a charge in said furnace produced a mixed slag which, in the crude state, had the following composition:

| | Percent |
|---|---|
| $Al_2O_3$ | 70–75 |
| $Al_2S_3$ | 20–25 |
| Fe | 2–5 |
| Si | 0.5 |
| Ti | 0.2–0.3 |

Following magnetic separation, the impurities were lowered to 0.1% Fe, 0.1% Si and 0.2–0.3% Ti.

After careful washing with dilute hydrochloric acid, there was obtained a product having the following composition:

| | Percent |
|---|---|
| $Al_2O_3$ | 99–99.5 |
| S | Traces |
| Fe+Si | 0.5 |
| Ti | 0.2–0.3 |

When using a low-stack blast furnace having a diameter of 1.50 m. at the level of the tuyeres, the sulfur losses decreased markedly and the ratio pyrites/bauxite in the charge could be reduced.

To utilize more completely the sulfur contained in the pyrites, there can be added to the charge a certain proportion of iron scrap which holds back a portion of the sulfur evolved in the upper part of the furnace by the reaction $$FeS_2 \rightarrow FeS+S$$

The bauxite may also be presulfurized before being charged into the furnace by contacting it with the evolved gases in a special plant.

The alumina thus obtained is seldom used in the manufacture of electrolytic aluminum because of its titanium content; however, it is perfectly adapted for the manufacture of aluminum nitride or aluminum carbide, from which the pure metal can be recovered by thermal decomposition in a vacuum.

The term "cold blast" as used in the appended claims denotes a blast at substantially normal or ambient temperatures.

As to the increase in the consumption of pyrites depending upon the content of silica in the bauxite, it may be said that when this content is 7 to 15%—in the case of low-stack blast furnace having 1 meter in diameter—the supplemental consumption of pyrites reaches, in average, about 700 grams per kg. of silica introduced by the bauxite.

The influence of variations in the diameter of the low-stack blast furnace upon the ratio pyrite/bauxite of the charge is approximately given by the following figures.

The ratio pyrite/bauxite reaches about: 25% with furnace having 1.5 m. in diameter on the level of the tuyeres; it reaches 50% with furnace having 0.80 m. in diameter on the level of the tuyeres; it reaches 80% with furnace having 0.60 m. in diameter on the level of the tuyeres.

According to a further feature of the invention, the gas leaving the furnace is treated to remove sulfur contained therein, the purified gas is burned, and the resultant hot combustion gases are used to preheat the blast.

We claim:

1. In the process of producing alumina from silica-containing bauxite, iron pyrites and solid carbonaceous material, the improvement in said process which comprises the steps of: forming a charge of said bauxite, iron pyrites and solid carbonaceous material, the ratio pyrites/bauxite in said charge varying between 0.25 and 0.80 with variation of furnace diameter at the level of the tuyeres between about 1.5 m. and 0.6 m., the smaller ratio being used with the greater diameter; feeding the charge into a low-stack blast furnace; forcing into the furnace an oxidizing blast of oxygen-enriched air having an oxygen content of 50–70%, and maintaining by combustion in said furnace a zone at a temperature ranging between 1750°–1850° C.; passing the charge through said zone and thereby producing a slag comprising a major portion of $Al_2O_3$ and 15–25% $Al_2S_3$; removing said slag from the furnace; adding a hydrolyzing reagent to said slag to hydrolyze the sulfide therein to yield thereby alumina, and recovering the alumina therefrom.

2. Process according to claim 1, wherein the bauxite contains 7 to 15% silica, the furnace diameter is about 1 meter, and the proportion of pyrites in the charge is increased by about 700 grams per kilogram of silica introduced by the bauxite.

3. Process according to claim 1, wherein sulfur is evolved in the furnace, and iron scrap is added to the charge to bind the evolved sulfur.

4. Process according to claim 1, wherein the lower portion of said zone maintained within the temperature range of 1750°–1850° C. is situated above the level of the tuyeres supplying said blast.

5. Process according to claim 1, wherein any gas leaving the furnace is treated to remove sulfur contained therein, the gas purified of sulfur is burned, and the resultant hot combustion gases are used to preheat the blast.

6. Process according to claim 1, wherein ferrosilicon is formed in the furnace and the slag separates in a fluid state from the ferrosilicon.

References Cited in the file of this patent

UNITED STATES PATENTS

| | | |
|---|---|---|
| Re. 17,001 | Haglund | June 19, 1928 |
| 1,551,615 | Parsons et al. | Sept. 1, 1925 |
| 1,797,655 | Haglund | Mar. 24, 1931 |
| 1,987,629 | Miner | Jan. 15, 1935 |
| 2,163,532 | Barnes | June 20, 1939 |
| 2,684,897 | Diettrich | July 27, 1954 |
| 2,727,815 | Kjellman | Dec. 20, 1955 |
| 2,832,682 | Reygagne | Apr. 29, 1958 |

FOREIGN PATENTS

| | | |
|---|---|---|
| 7 | Russia | of 1940 |